Jan. 4, 1966  S. L. LAWRENCE ETAL  3,227,104
HAY WAFERING METHOD AND APPARATUS
Filed Nov. 5, 1962
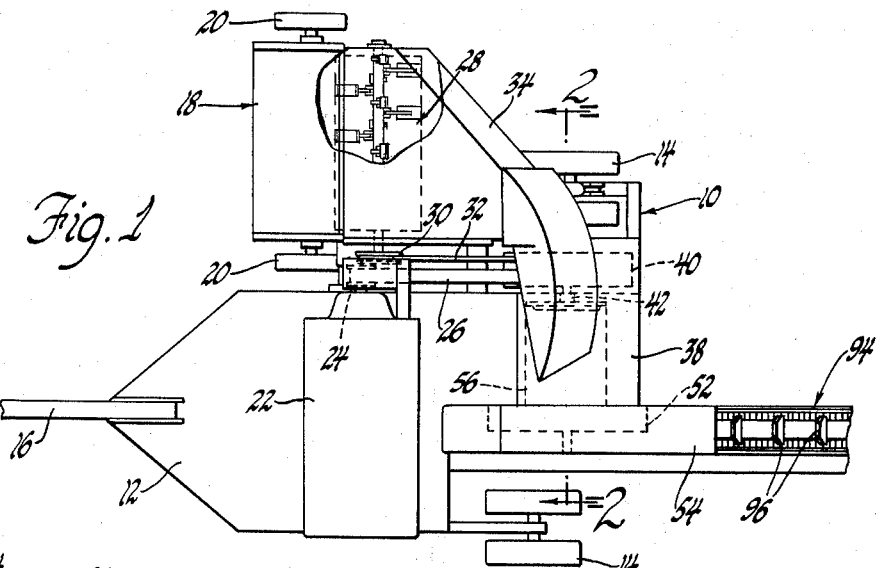
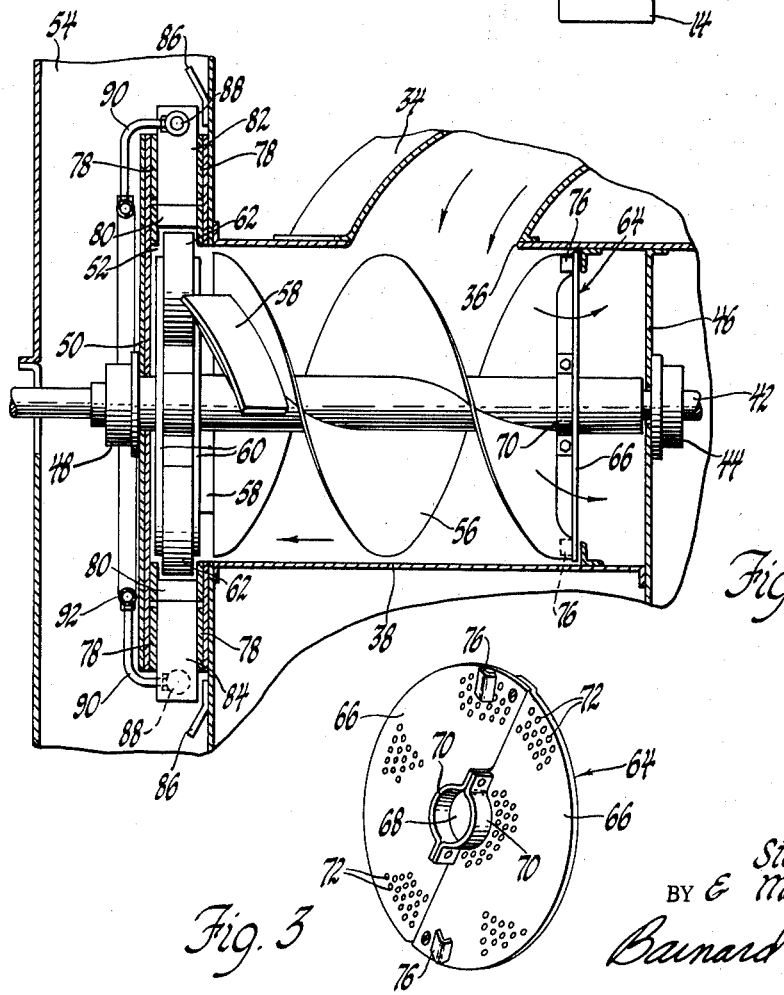
INVENTORS
Stanley L. Lawrence,
BY & Merle H. Peterson
Barnard & McGlynn
ATTORNEYS

United States Patent Office 3,227,104
Patented Jan. 4, 1966

3,227,104
HAY WAFERING METHOD AND APPARATUS
Stanley L. Lawrence and Merle H. Peterson, Livonia, Mich., assignors to Massey-Ferguson Inc., Detroit, Mich., a corporation of Maryland
Filed Nov. 5, 1962, Ser. No. 235,394
10 Claims. (Cl. 107—14)

This invention relates to a method and apparatus for producing hay wafers and, in particular, to a method and apparatus for field wafering forage crops into hay wafers which is particularly characterized by an improved method and means for feeding hay to the wafering apparatus.

In recent times, apparatus have been devised for field wafering forage crops into hay wafers comprising an annular series of axially open die cells including entrance ends thereof circumferentially spaced about and communicating with a wafering chamber in which there is mounted a rotary hay compaction or compression means for compacting or compressing hay received within the wafering chamber into and through the die cells to form hay wafers. A rotatable multiple flight feed auger has been disposed within an enclosing hopper having one end thereof communicating with the aforementioned chamber. A pick-up mechanism, such as of the rotary flail type including a plurality of spaced rapidly rotatable flails or arms, has been provided for picking up and delivering hay, preferably preconditioned or processed, finely chopped, mixed and blended hay from a windrow within a field, to the aforementioned hopper for feed therefrom to the wafering chamber. As a result, as such an apparatus moves through a field of mown hay, the hay is continuously picked up and delivered to the aforementioned hopper from which it is fed by the multiple flight feed auger to the wafering chamber and the rotary hay compaction or compression means aforementioned to provide a continuous extrusion of compressed or compacted hay of substantially uniform quality, constituency, shape and density emerging from the exit ends of the respective die cells, and each extrusion is adapted to be engaged with an ejection means adjacent the exit end of each of the die cells to break the respective extrusions of hay into wafers of substantially uniform length, which then preferably fall upon a conveyor means for removal from the apparatus.

In an apparatus of the type aforementioned, the hay mixture picked up and delivered by the aforementioned pick-up mechanism is entrained in or accompanied by an air stream traveling at considerable velocity due to the action of the rapidly rotating flails or arms of the pick-up mechanism. It has been found that, if this air stream or at least a substantial portion thereof is not separated from the hay being delivered to the hopper, a back pressure will build up in the latter retarding to a substantial extent further continuous supply of hay thereto by the rotary flails pick-up mechanism or the like. As a consequence, relatively elaborate arrangements have been made heretofore to separate the air stream from the hay prior to its delivery to the hopper.

For example, means have been provided in association with the delivery chute of the rotary flail type of pick-up mechanism for separating the air stream from the hay propelled through the delivery chute, and diverting or venting the air stream from the delivery chute. In other instances, often in combination with a venting arrangement aforementioned, various vent openings have been provided in other portions of the apparatus and even in a side wall of the hopper alongside the feed auger therein which, of course, is not too satisfactory since hay may be lost therethrough either while delivering hay to the hopper or during the feeding action therefrom under the influence of the feed auger, or both.

In view of the foregoing considerations, the present invention contemplates an improved method and apparatus for making compressed hay wafers and of the general type aforementioned having an annular series of axially open die cells including entrance ends thereof circumferentially spaced about and communicating with a wafering chamber in which there is mounted a rotary hay compaction or compression means for compacting or compressing hay received within the wafering chamber into and through the respective die cells to form wafers, and particularly characterized by a feed hopper having one end thereof communicating with the aforementioned wafering chamber, a multiple flight feed auger rotatably disposed within the hopper for feeding hay therefrom through the one end thereof to the aforementioned wafering chamber, a vent screen including a plurality of small vent openings therethrough substantially closing the other end of the feed hopper, and means for delivering hay to be wafered in an accompanying air stream to the hopper intermediate the ends of the latter and between the aforementioned wafering chamber and vent screen, whereby at least a portion of the accompanying air stream is vented through the vent screen while the latter prevents any loss of hay which is fed axially along the feed auger through the other end of the hopper into the wafering chamber.

More specifically in this regard, the invention is further characterized by the fact that the vent screen is fixed to the feed auger for rotation with the latter resulting in any hay traveling toward the vent screen with the air stream to be vented being thrown by centrifugal force against the outer side wall of the hopper thereby facilitating separation and venting of the air stream, the vent screen being so related to the ends of the auger flights remote from the wafering chamber and the side wall of the hopper so as to scrape such hay therefrom for feed to the wafering chamber.

In order to facilitate an understanding of the invention, a preferred embodiment thereof will now be described with reference to the accompanying drawing in which:

FIGURE 1 is a top plan view of a hay wafering apparatus embodying the invention;

FIGURE 2 is an enlarged fragmentary sectional view taken on line 2—2 of FIGURE 1; and FIGURE 3 is a perspective view of a vent screen utilized in the apparatus.

Referring now to the drawing, the numeral 10 in FIGURE 1 generally indicates a hay wafering apparatus comprising a frame 12 equipped with ground-engaging wheel means 14 in the usual manner, and a drawbar 16 adapted to be hitched to a suitable prime mover, such as an agricultural tractor, for drawing the frame along a field of mown hay. A pick-up mechanism for mown hay in the field is indicated generally at 18, is equipped with ground-engaging wheel means 20 in the usual manner and is suitably coupled in a conventional way to the frame of the apparatus so as to be towed with the latter. A suitable engine 22 is mounted on the frame 12 and includes an output shaft mounting a pulley means 24 entraining belt means 26 to drive various of the instrumentalities of the apparatus as will be pointed out hereinafter.

The apparatus aforedescribed is adapted to be towed along a field of mown or cut hay, preferably with the hay arranged in windrows and having been preconditioned or processed in a known manner so as to consist of finely chopped, mixed and blended stem and leaf components forming a substantially homogeneous mass. As the apparatus is towed along the field, the hay mixture in a given windrow is adapted to be picked up in the pick-up mechanism 18 which preferably includes a rotary flail device indicated generally at 28 and driven by a shaft connected to a pulley 30 driven by belt means 32 powered by the engine as will be pointed out hereinafter. Being of known construction, it will suffice to point out that the rotary flail device 28 includes a plurality of rapidly rotatable flails or arms operable to direct the homogenized hay in an accompanying air stream at relatively high velocity into the delivery chute 34 of the pick-up mechanism which delivers the hay and accompanying air stream through a suitable opening 36 in the substantially continuous side wall of a horizontally disposed cylindrical feed hopper 38 suitably mounted on frame 12 and having axially opposite open ends.

A large pulley or fly wheel 40 is secured to one end of a horizontally disposed drive shaft 42 axially beyond one open end of the hopper, and is drivingly connected to the engine by the aforementioned belt means 26, and further transmits power to the rotary flail device 28 by the belt means 32 aforedescribed. The drive shaft 42 is suitably rotatably supported in suitable bearing means 44 carried by a support rib 46 adjacent the one open end of the feed hopper, and further by bearing means 48 adjacent a wall member 50 axially opposite from the hopper. As appears particularly in FIGURE 2, the drive shaft 42 extends horizontally through the hopper 38, through an annular vertically disposed wafering chamber 52 disposed between wall member 50 and the adjacent open end of the hopper with which it communicates, and beyond the chamber through an enlarged housing member 54 encasing the wafering chamber. A double flight feed auger 56 is secured on the drive shaft 42 within the hopper 38 so as to extend between the ends of the latter and is radially inwardly spaced from the cylindrical side wall thereof, while a pair of arcuate deflector vanes 58 project from one end of each auger flight into the wafering chamber 52. A pair of axially spaced radially extending arms 60 have their central portions suitably rigidly secured to the drive shaft 42 for rotation therewith within the wafering chamber 52, and have the compaction rollers 62 respectively journaled at the opposite ends thereof. The deflector vanes 58 are disposed in advance of the path of rotation of the arms 60 and the respective rollers 62 within the wafering chamber for a purpose to appear hereinafter.

A disk like vent screen is indicated generally at 64 in FIGURES 2 and 3 and, referring to FIGURE 3 in particular, comprises a pair of mating semi-circular parts 66 having mating edges adapted to overlap each other and be secured together into a unitary disk as illustrated in FIGURE 3. The assembled disk includes a central opening 68 for receiving the auger hub on the drive shaft 42, the clamp bracket construction 70 being provided to firmly secure the vent screen to the auger hub for rotation with the drive shaft. The screen 64 includes a multiplicity of small perforations or vent openings 72 therethrough, and also a suitable number of peripherally spaced scraper brackets 76, in this case two in number corresponding to the two flights of the feed auger 56.

As will be clear particularly from FIGURE 2, the vent screen is adapted to be mounted upon the auger hub and firmly secured thereto by the clamp bracket construction 70 for rotation therewith at the open end of the hopper remote from the wafering chamber 52, the scraper brackets 76 being disposed adjacent the respective ends of the auger flights likewise remote from the ends thereof which feed hay into the wafering chamber. In addition, the periphery of the vent screen 64, the scraper brackets 76 and the aforementioned ends of the auger flights are spaced from but closely proximate to the side wall of the hopper 38 so as to provide a scraping action for hay which may become deposited thereon in a manner to be described hereinafter.

Thus, as the apparatus is towed along a field of mown hay and hay in an accompanying air stream at relatively high velocity is supplied to the hopper 38 intermediate the ends thereof and between the wafering chamber 52 and vent screen 64 as aforementioned, at least a substantial portion of the accompanying air stream is separated from the heavier hay particles and travels axially to the right in FIGURE 2 and is vented through the vent screen 64 to atmosphere to prevent any pressure build-up within the hopper which might otherwise retard continuous delivery of hay thereto through the delivery chute 34. At the same time, of course, a substantial portion of the hay so delivered will be fed axially along the feed auger to the left in FIGURE 2 and into the wafering chamber 52. In this regard, any portion of the hay entrained in the air being so vented is prevented from escaping from the hopper by the vent screen and, due to centrifugal forces imposed on such hay by the rotating screen, is thrown radially outwardly onto the side wall of the hopper 38 and is scraped or otherwise dislodged therefrom by the adjacent ends of the auger flights, periphery of the screen 64 and, in particular, by the scraper brackets 76, with the end result that such hay is returned radially toward the feed auger for feed therealong toward the wafering chamber.

The wafering chamber 52, the die cells associated therewith and through which the hay is adapted to be compacted or compressed by the rollers 62 to form extrusions of compacted hay emerging from the exit ends thereof, and the means for breaking wafers from such extrusions and conveying them from the apparatus may be constructed in any one of various known ways, one of which is illustrated in the drawing. Since the details of such construction do not, in and of themselves, form any part of the present invention and are known, a brief description of the nature and operation of these components of the apparatus should suffice for present purposes.

Thus, the wafering chamber 52 includes a pair of spaced vertically disposed parallel annular die wall members 78 suitably fixedly disposed as to the wall member 50 and an opposite wall of the housing member 54, there being fixedly disposed between such annular die wall members an annular or circumferentially spaced series of knife edges 80. An annular or circumferentially spaced series of pairs of side die wall members 82 and 84 are disposed between the die wall members 78, and have their radially inner ends suitably hingedly connected adjacent a radially outward portion of each of the respective fixed knife edges 80 so as to diverge radially outwardly therefrom in a V-shaped configuration. Thus, a series of axially open radially extending die cells are formed between the die wall members 78 and the respective oppositely spaced side die wall members 82 and 84 of an adjacent pair thereof as will be readily apparent to those acquainted with this art, and the axes of such die cells are contained in a common vertical plane or a plane vertical with the ground, with the entrance ends thereof communicating with the wafering chamber 52. An annular series of ejector plates 86, one for each die cell, is suitably secured to a wall of the housing 54 and are shaped so as to extend obliquely to the axis of the die cells and over the exit ends thereof for engagement with extrusions of compacted hay emerging therefrom to break the extrusions into wafers.

The numeral 88 indicates conventional hydraulically operated motor assemblies of the type comprising relatively reciprocable piston and cylinder elements interposed between each hinged pair of side die wall members 82 and 84 to control their angular relationship relative to each other and, hence, the extent of convergence of the areas of the die cells between their entrance and exit ends, each of the motor assemblies being connected in the usual manner through a conduit 90 to a common annular manifold 92 connected to a suitable source of fluid under pressure carried by and manually controlled from the frame 12.

As will be apparent, the rollers 62 are positioned closely to but do not engage the knife edges 80. Thus, hay fed continuously by the feed auger 56 from the hopper 38 into the wafering chamber 52 is laid by the deflector vanes 58 across the knife edges 80 and upon the entrance ends of the respective die cells immediately in advance of the rotative path of the rollers, which rollers compact or compress the hay and force it past the knife edges and into and through the respective die cells upon successive rotative passes thereof.

As the extrusions of hay emerge from the exit ends of the respective die cells, such extrusions engage the respective ejector plates 86 which cause them to bend and break substantially at the exit ends of the die cells to form wafers which drop within and toward the bottom of the housing 54 then, through an opening therein not shown, onto one end of an elevator type conveyor 94 of conventional construction equipped with spaced conveyor paddles 96 which pick up the hay wafers and convey them from the apparatus, preferably into a trailing conveyance.

The embodiments of the invention in which an exclusive property or privilege is claimed are defined as follows:

1. In an apparatus for making compressed hay wafers, and of the type having an annular series of die cells including entrance ends thereof circumferentially spaced about and communicating with a wafering chamber in which there is mounted a rotary hay compaction means for compacting hay received within said chamber into and through said die cells to form wafers, the improvement comprising means including a feed hopper having one end thereof communicating with said chamber for feeding hay from said hopper into said chamber, a vent screen substantially closing the other end of said hopper, and means for delivering hay to be wafered in an accompanying air stream into said hopper, whereby at least a portion of the air is separated from the hay and vented through said vent screen.

2. In an apparatus for making compressed hay wafers, and of the type having an annular series of die cells including entrance ends thereof circumferentially spaced about and communicating with a wafering chamber in which there is mounted a rotary hay compaction means for compacting hay received within said chamber into and through said die cells to form wafers; the improvement comprising a feed hopper having one end thereof communicating with said chamber, a vent screen including a plurality of vent openings therethrough substantially closing the other end of said hopper, a rotatable feed auger including a rotatable drive shaft and a plurality of auger flights extending therealong between the ends of said hopper and means for delivering hay to be wafered in an accompanying air stream into said hopper intermediate the ends of the latter, whereby at least a portion of the air is separated from the hay and vented through said vent screen.

3. The apparatus according to claim 2 in which said vent screen is secured to said drive shaft for rotation with the latter.

4. The apparatus according to claim 3 in which said vent screen is secured to said drive shaft adjacent the ends of said auger flights remote from said wafering chamber, the peripheries of said vent screen and said ends of said auger flights being spaced closely adjacent to said hopper.

5. The apparatus according to claim 4 further comprising a plurality of spaced scraper means corresponding to the number of said auger flights secured adjacent the periphery of said vent screen and said ends of said auger flights to scrape hay from said hopper.

6. The apparatus according to claim 5 in which said drive shaft is disposed substantially horizontally within said hopper and perpendicular to the plane of said die cells.

7. The apparatus according to claim 5 in which said drive shaft is drivingly connected to said rotary hay compaction means for rotation with the latter.

8. In an apparatus for making compressed hay wafers, and of the type having an annular series of die cells including entrance ends thereof circumferentially spaced about and communicating with a wafering chamber in which there is mounted a rotary hay compaction means for compacting hay received within said wafering chamber into and through said die cells to form wafers; the improvement comprising a feed hopper including a substantially continuous cylindrical side wall having one end thereof communicating with said chamber, feed auger means including a rotatable drive shaft and plurality of auger flights extending therealong between the ends of said hopper, a vent screen including a plurality of vent openings therethrough secured to said shaft for rotation with the latter and substantially closing the other end of said hopper, and means for delivering hay to be wafered in an accompanying air stream into said hopper intermediate the ends of the latter, whereby at least a portion of the air is separated from the hay and vented through said vent screen.

9. The apparatus according to claim 8 in which said vent screen is secured to said shaft adjacent the ends of said auger flights remote from said wafering chamber, the peripheries of said vent screen and said ends of said auger flights being spaced closely to said wall of said hopper.

10. The apparatus according to claim 9 further comprising a plurality of spaced scraper brackets corresponding to the number of said auger flights secured adjacent the periphery of said vent screen and said ends of said auger flights to scrape hay from said wall of said hopper.

References Cited by the Examiner

UNITED STATES PATENTS

| 2,777,403 | 1/1957 | Mladek | 18—12 |
| 3,034,421 | 5/1962 | Pence | 100—90 XR |
| 3,153,889 | 10/1964 | Peterson | 56—1 |

FOREIGN PATENTS

| 1,055,653 | 10/1953 | France. |
| 1,250,174 | 11/1960 | France. |
| 570,471 | 7/1945 | Great Britain. |

OTHER REFERENCES

Western Livestock Journal: April 1961, 100-pelleters, pages 36 and 39.

Agricultural Engineering S.671.A3: August 1961, 56–1, (pages 412–415 and 423).

WALTER A. SCHEEL, *Primary Examiner.*